(12) United States Patent
Coxon et al.

(10) Patent No.: US 9,162,396 B2
(45) Date of Patent: Oct. 20, 2015

(54) METHOD FOR FORMING FUSELAGE STRINGERS

(71) Applicant: The Boeing Company, Chicago, IL (US)

(72) Inventors: Brad Andrew Coxon, Everett, WA (US); Mark Klewiada, Seattle, WA (US); Donald Edward Wright, Seattle, WA (US); Andrew E. Modin, Enumclaw, WA (US)

(73) Assignee: THE BOEING COMPANY, Chicago, IL (US)

( * ) Notice: Subject to any disclaimer, the term of this patent is extended or adjusted under 35 U.S.C. 154(b) by 309 days.

(21) Appl. No.: 13/650,502

(22) Filed: Oct. 12, 2012

(65) Prior Publication Data

US 2014/0103585 A1    Apr. 17, 2014

(51) Int. Cl.
*B29C 70/44*    (2006.01)
*B29C 70/54*    (2006.01)
*B29C 70/56*    (2006.01)
*B29D 99/00*    (2010.01)

(52) U.S. Cl.
CPC ............. *B29C 70/446* (2013.01); *B29C 70/541* (2013.01); *B29C 70/56* (2013.01); *B29D 99/0003* (2013.01)

(58) Field of Classification Search
CPC .... B29C 70/446; B29C 70/541; B29C 70/56; B29C 51/12; B29C 51/262; B29C 51/38; B29D 99/0003
See application file for complete search history.

(56) References Cited

U.S. PATENT DOCUMENTS

| | | | | | |
|---|---|---|---|---|---|
| 2,378,642 | A | * | 6/1945 | Kopplin | 264/137 |
| 2,797,179 | A | * | 6/1957 | Kress et al. | 264/257 |
| 2,843,071 | A | * | 7/1958 | Kitzinger | 72/351 |
| 2,847,957 | A | * | 8/1958 | Watter et al. | 72/60 |
| 3,264,392 | A | * | 8/1966 | Taplin | 264/231 |
| 3,349,153 | A | * | 10/1967 | Beck | 264/512 |
| 4,045,986 | A | * | 9/1977 | Laycock et al. | 72/60 |
| 4,443,401 | A | * | 4/1984 | Turner | 264/544 |
| 4,745,792 | A | * | 5/1988 | Story et al. | 72/351 |
| 4,846,352 | A | * | 7/1989 | Bailey | 209/399 |
| 4,961,700 | A | * | 10/1990 | Dunbar | 425/394 |

(Continued)

FOREIGN PATENT DOCUMENTS

EP    0123225 A1    10/1984

OTHER PUBLICATIONS

PCT Search Report and Written Opinion, dated Dec. 4, 2013, regarding Application No. PCT/US2013/057790, 11 pages.

*Primary Examiner* — Matthew Daniels
(74) *Attorney, Agent, or Firm* — Yee & Associates, P.C.

(57) ABSTRACT

A composite part, such as a stiffener is formed in place. A composite charge is placed on a tool spanning a mold cavity, with the centerline of the charge offset from the centerline of the mold cavity. Opposite sides of the charge are held against the tool as the charge is formed into the mold cavity. One side of the charge is held against movement on the tool while the other side of the charge is allowed to slip over the tool toward the mold cavity.

16 Claims, 10 Drawing Sheets

(56) References Cited

U.S. PATENT DOCUMENTS

| | | | | |
|---|---|---|---|---|
| 5,037,599 A | * | 8/1991 | Olson | 264/510 |
| 5,755,129 A | * | 5/1998 | Yamasaki | 72/57 |
| 6,814,916 B2 | | 11/2004 | Willden et al. | |
| 7,118,370 B2 | | 10/2006 | Willden et al. | |
| 7,141,199 B2 | * | 11/2006 | Sana et al. | 264/255 |
| 7,651,650 B2 | | 1/2010 | Willden et al. | |
| 2004/0043196 A1 | * | 3/2004 | Willden et al. | 428/174 |
| 2006/0231981 A1 | | 10/2006 | Lee et al. | |
| 2006/0237888 A1 | * | 10/2006 | Burton et al. | 269/22 |
| 2008/0014453 A1 | | 1/2008 | Levesque et al. | |
| 2009/0320292 A1 | | 12/2009 | Brennan et al. | |
| 2010/0074979 A1 | * | 3/2010 | Cundiff et al. | 425/112 |
| 2011/0291325 A1 | | 12/2011 | Mattia | |

\* cited by examiner

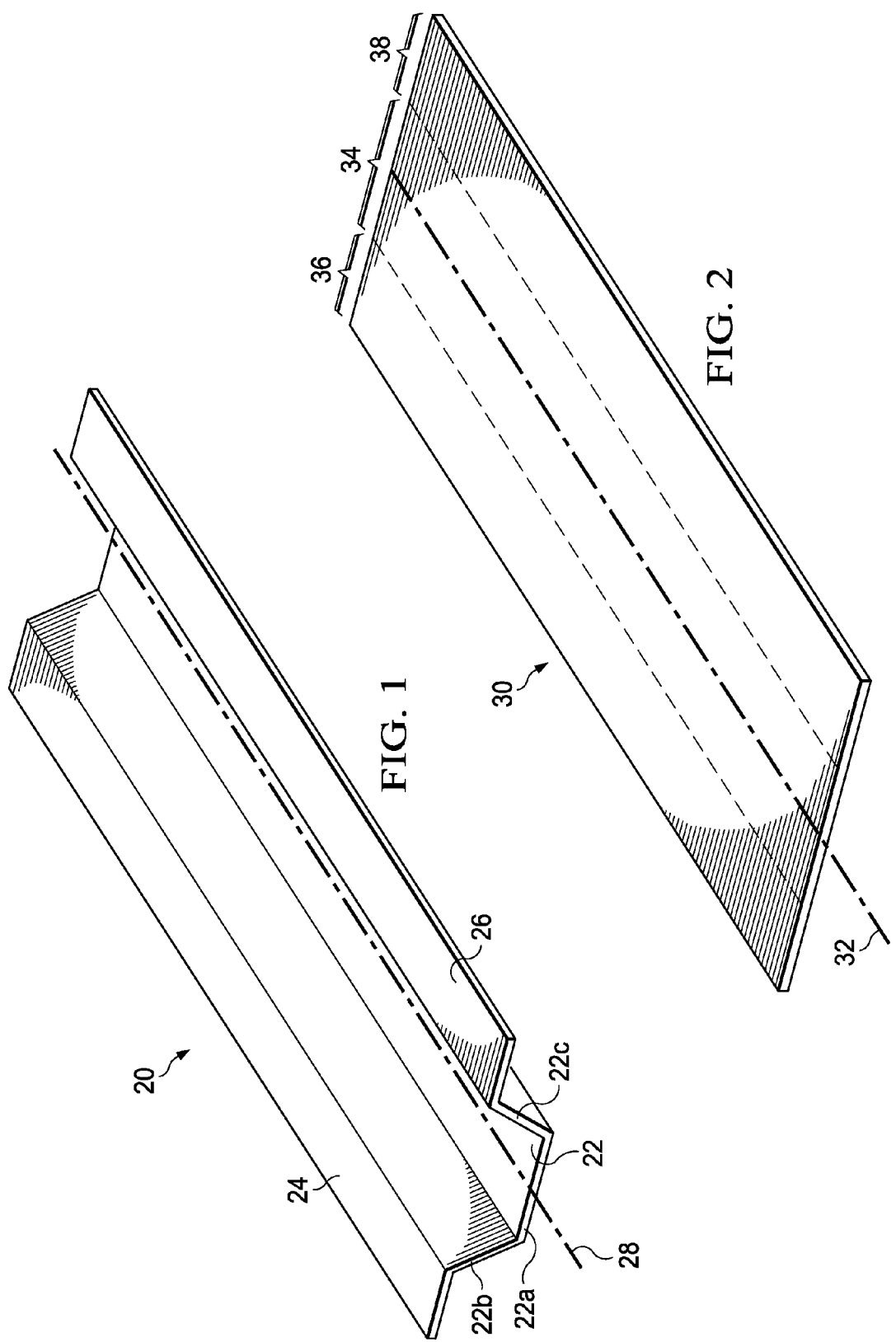

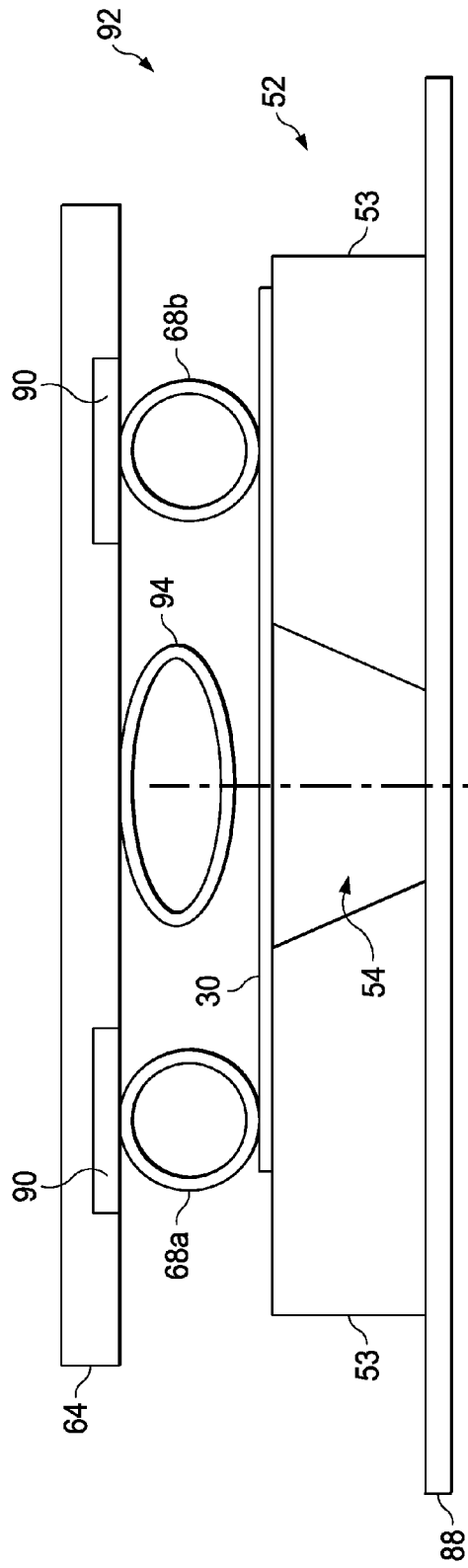
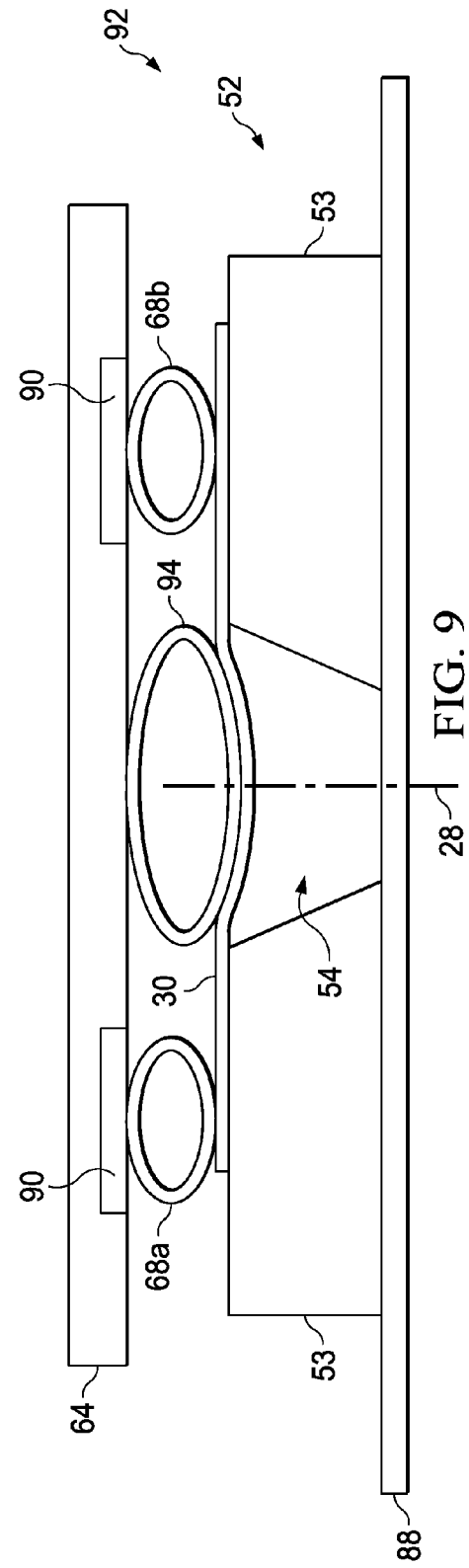

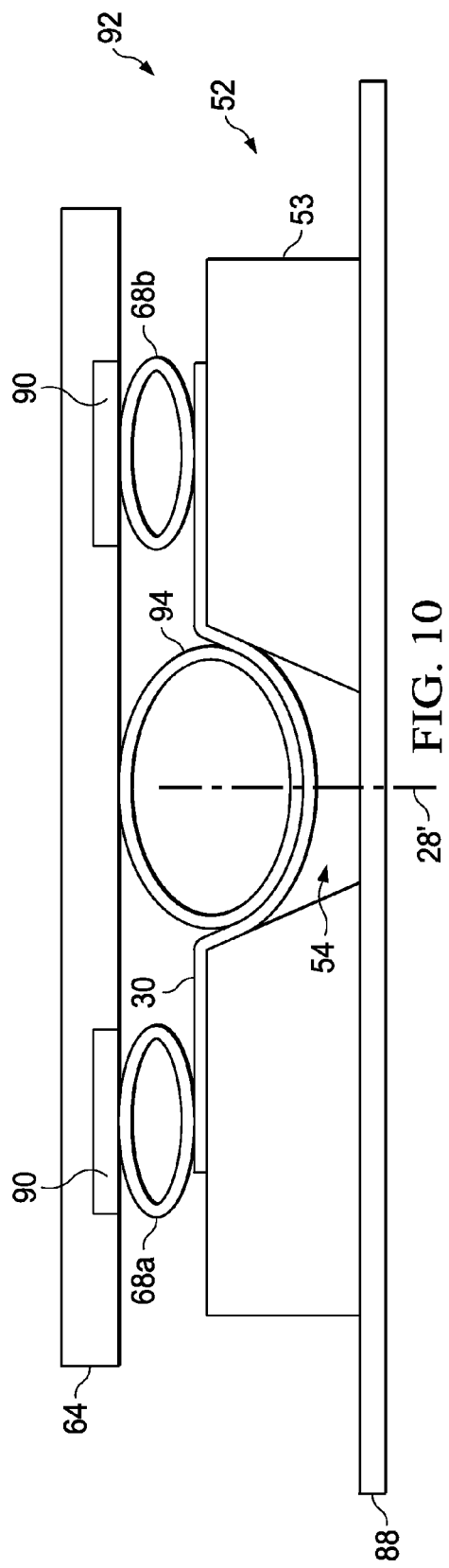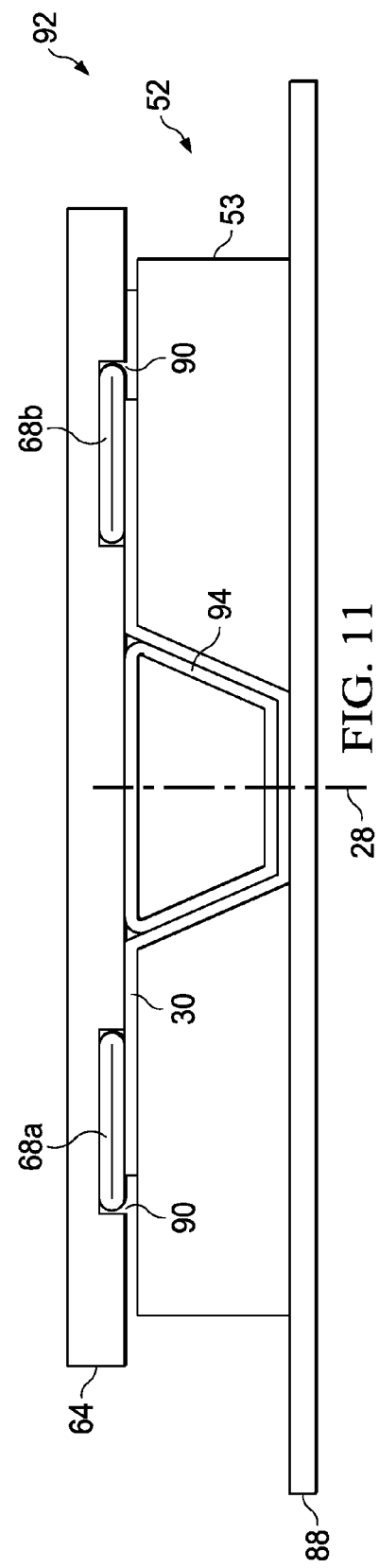

METHOD FOR FORMING FUSELAGE STRINGERS

BACKGROUND INFORMATION

1. Field

This disclosure generally relates to the fabrication of composite parts, and deals more particularly with a method and apparatus for forming stiffeners, such as aircraft fuselage stringers.

2. Background

Composite parts, such as stiffeners used in the aircraft industry, may be fabricated in a multi-step process in which separate tooling is used for laying up, forming-to-shape, and curing a multi-ply composite charge. The composite charge may assembled by sequentially laying up individual plies according to a predetermined ply schedule, either by hand or using automated equipment, on a layup tool or other substrate. During this initial layup process, the layup tool may include features that preform the charge. The preformed charge is then transferred to a male or female mold in a press former where the preformed charge is formed to final shape. The formed charge is then transferred to an IML (inner mold line) cure tool where it is cured in an autoclave or an oven.

The need for separate tools for laying up and curing of composite parts adds to production flow times, material and/or labor costs, and may contribute to undesirable tolerance location buildup. Additionally, the use of separate tools for layup and cure introduces the potential for the part layup to change shape and/or wrinkle caused by transportation and/or relaxation from dwell times at pre-installation stages.

In addition to the problems discussed above, existing press forming equipment used to form composite charges to final shape may allow the composite charge to shift out of position during the forming process as the charge is compressed between male and female tool dies. When the charge shifts out of position during forming, the finished part may be out of tolerance or mis-shaped, causing the part to be scrapped.

Accordingly, there is a need for a method and apparatus for forming a composite part, such as a stiffener, in-place in a cure tool, thus eliminating the need for layup or forming tools. There is also a need for a method and apparatus of the type mentioned above which controls the centerline position of the composite charge as it is being formed on the cure tool.

SUMMARY

The disclosed embodiments provide a method and apparatus for forming composite part charges, such as fuselage stringers and other stiffeners, in place on a cure tool. By forming the charge in-place directly on a cure tool, layup and/or forming tooling may be eliminated, and undesired tolerance location buildup, wrinkling and dimensional changes may be avoided. The position of the centerline of the charge is controlled throughout the forming process using simple tool elements.

According to one disclosed embodiment, a method is provided of forming a composite part. The method comprises placing a composite charge on a tool spanning a mold cavity in the tool, forming the composite charge into the mold cavity, and holding opposite sides of the composite charge against the tool as the composite charge is being formed into the mold cavity, including holding one of the opposite sides of the composite charge against movement on the tool during forming of the composite charge into the mold cavity while allowing the other of the opposite sides of the composite charge to slip over the tool. Placing the composite charge on the tool includes offsetting a centerline of the composite charge from a centerline of the mold cavity. The centerline of the composite charge is offset a distance related to a cross-sectional shape of the mold cavity. Forming the composite charge into the mold cavity is performed by forcing a bladder into the mold cavity, and expanding the bladder as the bladder is being forced into the mold cavity. Holding opposite sides of the composite charge against the tool is performed by bringing first and second bladders into contact with the opposite sides of the composite charge, and pressurizing each of the first and second bladders. Forming the composite charge into the mold cavity is performed by bringing a forming bladder into contact with the charge, forcing the forming bladder into the mold cavity, inflating the forming bladder as the forming bladder is forced into the mold cavity, holding opposite sides of the composite charge against the tool using first and second pinch bladders, and adjusting a pressurization of at least one of the first and second pinch bladders as the forming bladder moves into the mold cavity.

According to another disclosed method, a method is provided of fabricating a composite stiffener. The method comprises laying up a generally flat composite charge having first and second opposite sides, and having a centerline, placing the composite charge on an inner mold line cure tool having a mold cavity with a centerline, including indexing the composite charge on the cure tool such that the centerline of the composite charge is offset from the centerline of the mold cavity, forming the composite charge into the mold cavity, pinching the first side of the composite charge against the cure tool with a force sufficient to prevent movement of the first side as the composite charge is being formed into the mold cavity, and pinching the second side against the tool with a force that allows the second side to slip toward the mold cavity as the composite charge is being formed into the mold cavity. Indexing the composite charge on the cure tool includes offsetting the centerline of the composite charge from the centerline of the mold cavity a distance related to the cross-sectional shape of the mold cavity. Pinching the first and second sides of the composite charge against the tool is respectively performed using first and second pinch bladders, and inflating the first and second pinch bladders to differing levels of pressurization. Forming the composite charge into the mold cavity is performed by bringing a forming bladder into contact with the composite charge and progressively inflating the forming bladder. The method may further comprise adjusting the level of pressurization of the second pinch bladder as the forming bladder is being progressively inflated.

According to still another disclosed embodiment, a method is provided of fabricating a composite stiffener having a hat and a pair of opposite flanges. The method comprises laying up a composite charge having a hat portion and first and second flange portions respectively on opposite sides of the hat portion, and placing the composite charge on a tool spanning a mold cavity in the tool. The method further comprises tensioning the composite charge, holding the first flange portion against movement on the tool while the hat portion is being formed into the cavity, and holding the second flange portion against the tool while the hat portion is being formed into the cavity, including allowing the second flange portion to slip over the tool toward the cavity while the hat portion is being formed into the cavity. The composite charge has a centerline passing through the hat portion, and placing the composite charge on the tool includes indexing the composite charge on the tool such that the centerline of the hat portion is offset a preselected distance from a centerline of the mold cavity. Holding the first flange portion against movement on the tool is performed by placing a first bladder against the first flange portion, and using the first bladder to apply a compressive force against the first flange portion sufficient to allow slippage of the first flange portion relative to the tool. Holding the second flange portion against the tool includes placing a second bladder against the second flange portion, and using the second bladder to apply a compressive force against the second flange portion that is less than the compressive force applied to the first flange portion by the first bladder.

According to another disclosed embodiment, apparatus is provided for fabricating a composite stiffener the apparatus comprises a tool having first and second tool surfaces and a mold cavity adapted to form a composite charge, the composite charge having first and second opposite sides, a forming bladder for forcing the composite charge into the mold cavity, and first and second pinch bladders respectively on opposite sides of the forming bladder and adapted to pinch the first and second opposite sides of the composite charge against the first and second tool surfaces while the charge is being forced into the mold cavity. The apparatus further comprises a pressurizing system for pressurizing the forming bladder and each of the first and second pinch bladders. The apparatus may also comprise a controller for controlling the pressurizing system, including a program for separately pressurizing the first and second pinch bladders to prevent movement of one of the opposite sides of the composite charge while allowing slippage of the other of the opposite sides of the composite charge over the tool toward the mold cavity as the forming bladder forces the composite charge into the mold cavity.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a perspective view of a composite stringer fabricated according to the disclosed method and apparatus.

FIG. 2 is an illustration of a perspective view of a flat composite charge used to fabricate the composite stringer shown in FIG. 1.

FIGS. 8-11 are illustrations of cross-sectional views of another embodiment of the apparatus, in progressive stages of forming a composite stringer charge into the stringer shown in FIG. 1.

DETAILED DESCRIPTION

Figure 3:
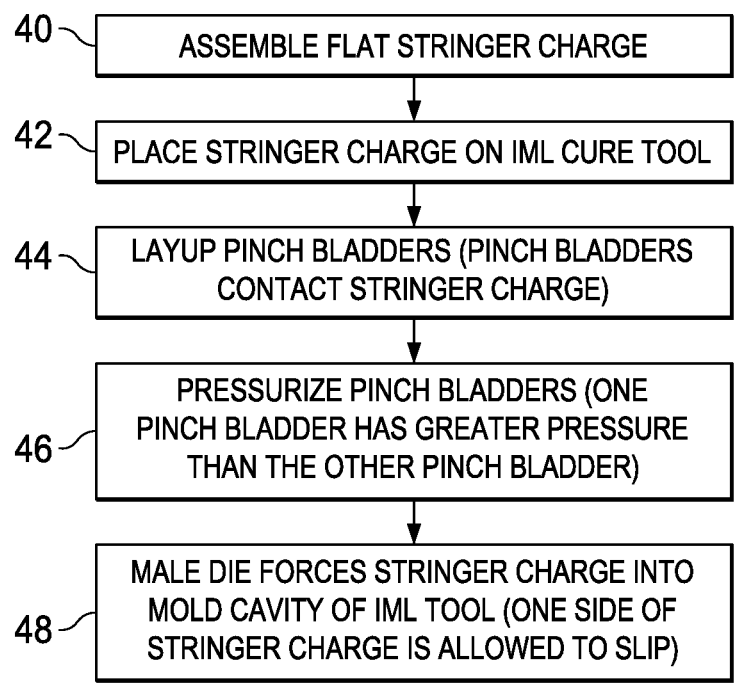
FIG. 3 is an illustration of a flow diagram of one embodiment of a method of forming a composite stringer charge.

Referring first to FIGS. 1 and 2, the disclosed embodiments relate to a method and apparatus for forming a substantially flat, elongate composite charge 30 into a part having a desired cross-sectional shape, such as the hat stringer 20 shown in FIG. 1. The stringer 20 is merely illustrative of a broad range of composite stiffeners and other composite parts that may be formed using the disclosed method and apparatus, including but not limited to round, hat-shaped stringers.

The hat stringer 20 broadly comprises a hat 22, and a pair of laterally extending flanges 24, 26 respectively. The hat 22 includes a top 22a (shown inverted in FIG. 1) and a pair of inclined sides 22b, 22c which respectively connect the top 22 with the flanges 24, 26. The hat stringer 20 is substantially symmetrical about a centerline 28. Other cross-sectional stringer geometries are possible. The composite charge 30 used to form the hat stringer 20 may comprise a pre-kitted stack of fiber reinforced resin plies (not individually shown), such as carbon fiber prepreg, which have been laid up manually or using automated material placement equipment, according to a predetermined ply schedule. The plies of the composite charge 30 may have varying fiber orientations, such as without limitation, 0°, +/−45° and 90° fiber orientations. The composite charge 30 includes a central hat portion 34 which forms the hat 22 of stringer 20, flanked on either side by outer flange portions 36, 38 which respectively form the flanges 24, 26 of the composite stringer 20. The composite charge 30 has a longitudinal centerline 32 which corresponds to the centerline 28 of the composite stringer 20 after the composite charge 30 has been formed to shape.

Figure 4:
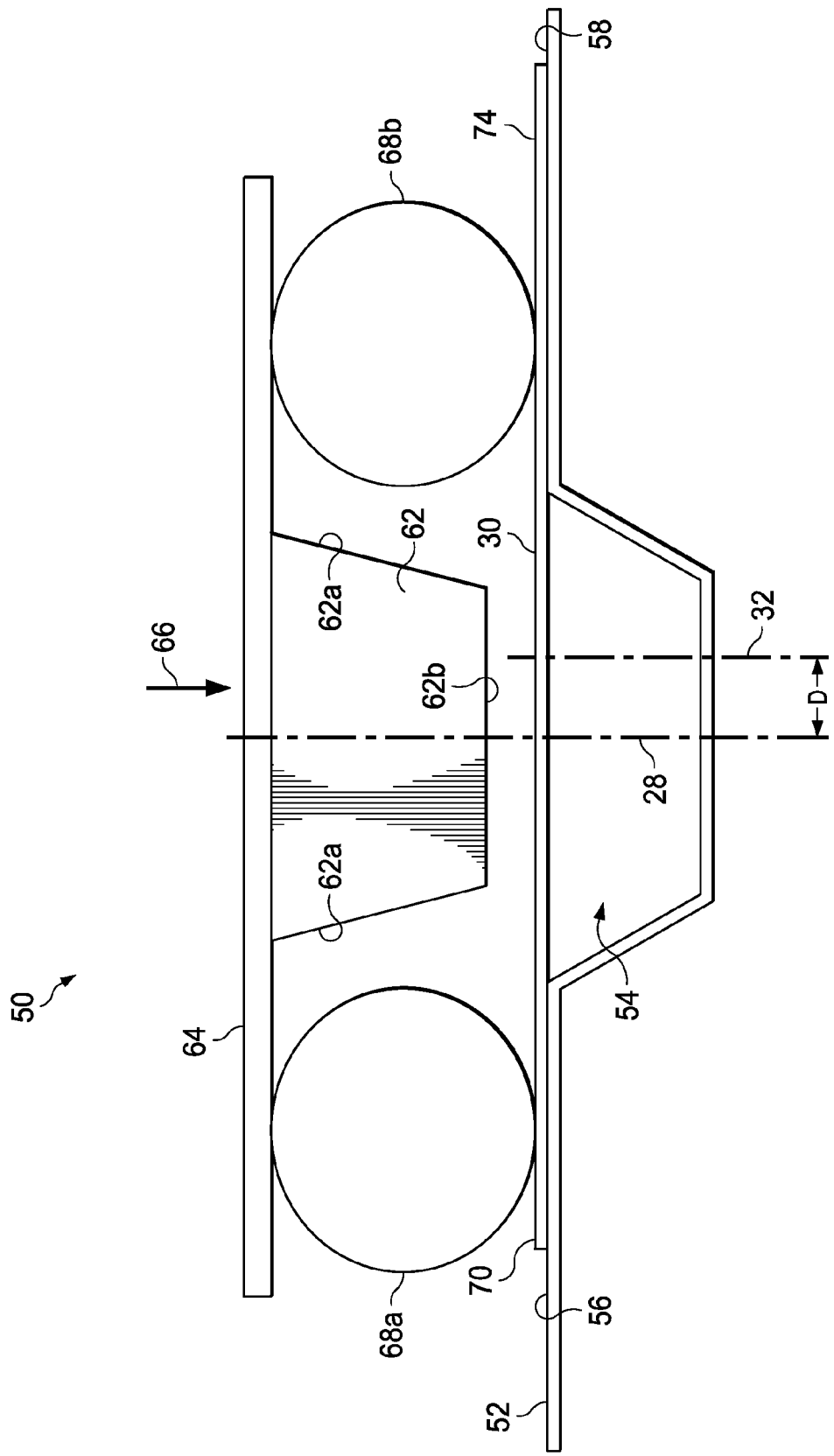
FIGS. 4-6 are illustrations of cross-sectional views of one embodiment of the apparatus, in progressive stages of forming a composite stringer charge into the stringer shown in FIG. 1.
Figure 5:
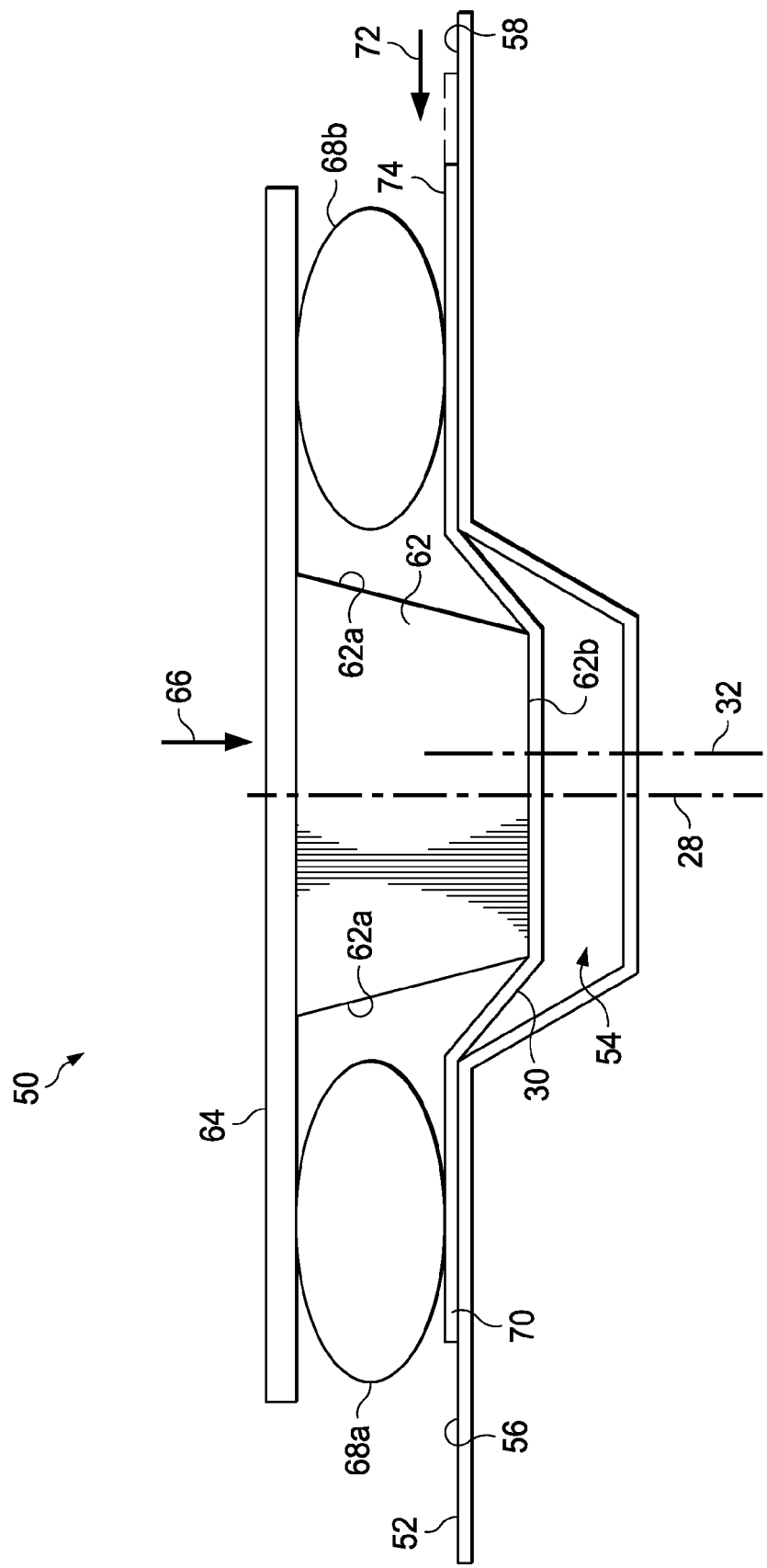
Figure 6:
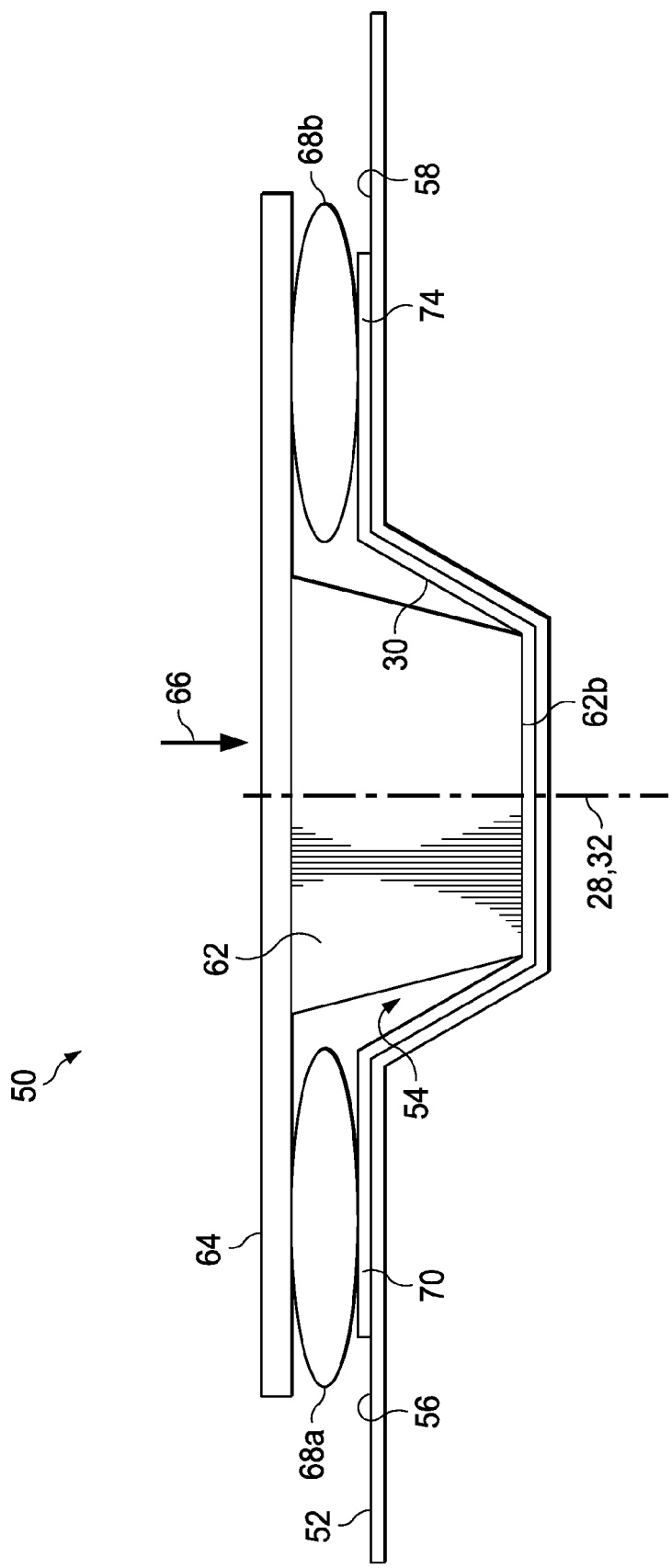

Attention is now directed to FIG. 3 which shows the overall steps of a method of forming the composite charge 30 in place, using the apparatus 50 shown in FIGS. 4-6. Referring particularly to FIG. 4, the apparatus 50 broadly comprises an IML cure tool 52 having a female mold cavity 54 flanked by a pair of tool surfaces 56, 58. The IML cure tool 52 has a cross-sectional shape substantially matching that of the stringer 20 shown in FIG. 1. The apparatus 50 further comprises a male die 62 having side surfaces 62a and a bottom surface 62b which together substantially match the cross-sectional shape of the hat stringer 22. The male die 62 may comprise any suitable, generally rigid material which may be slightly conformable to the shape of the mold cavity 54, such as an elastomeric rubber or a plastic.

The male die 62 may be attached to press platen or similar member which is movable in the vertical direction and capable of applying a force 66 that displaces the male die 62 down into the mold cavity 54. First and second bladders, which may comprise a pair of pinch bladders 68a, 68b, are respectively disposed on opposite sides of the male die 62 and positioned between the press platen 64 and tool surfaces 56, 58. The pinch bladders 68a, 68b may be formed of any suitable materials capable of being pressurized and inflated to the required degree using, for example, pneumatic pressure. In one application, each of the pinch bladders 68a, 68b may comprise a fire hose that is coupled with, and pressurized by a suitable pressurizing system 100 (See FIG. 12). The male die 62, as well as the pinch bladders 68a, 68b are symmetrically disposed about a centerline 28 that passes through the center of the mold cavity 54, and thus corresponds to the centerline 28 of the hat stringer 20 shown in FIG. 1.

Referring now concurrently to FIGS. 3 and 4, the composite stringer 20 shown in FIG. 1 is formed by assembling the flat stringer charge 30 at step 40 shown in FIG. 3, following which, at step 42, the stringer charge 30 is placed on the IML cure tool 52, spanning the mold cavity 54, with opposite sides 70, 74 of the charge 30 respectively supported on tool surfaces 56, 58. When placing the charge 30 on the tool 52, the charge 30 is indexed to the right, as viewed in FIG. 4, such that the centerline 32 of the charge 30 is offset a preselected distance "D" from the centerline 28 of the mold cavity 54. As will become later apparent, the offset distance "D" is related to the size and cross-sectional shape of the mold cavity 54, and allows control of the final location of the centerline 32 of the charge. Next, as shown at step 44 the pinch bladders 68*a*, 60*b* are installed on the charge 30, respectively in contact with the opposite sides of 70, 74 of the charge 30. At step 46, the pinch bladders 68*a*, 68*b* are pressurized to preselected pressure levels, with pinch bladder 68*a* being pressurized to a higher level than pinch bladder 68*b*, for reasons which will be discussed in more detail below. The press platen 64 is lowered into contact with the pinch bladders 68*a*, 68*b*, as shown in FIG. 4.

With the apparatus 50 having been readied for a forming cycle as shown in FIG. 4, step 48 shown in FIG. 3 is carried out in which the male die 62 forces the stringer charge 30 into the die cavity 54 of the IML cure tool 52, while one side 74 of the charge 30 is allowed to slip. As the male die 62 moves downwardly into the mold cavity 54, the bottom surface 62*b* engages the stringer charge 30, and the press platen 64 engages the pinch bladders 68*a*, 68*b*, thereby compressing the pinch bladders 68*a*, 68*b*. Compression of the pinch bladders 68*a*, 68*b* results in a downward force being applied to the opposite sides 70, 74 of the stringer charge 30 which presses the opposite sides 70, 74 of the stringer charge 30 against the tool surfaces 56, 58 to maintain the stringer charge 30 in tension during the remainder of the forming process. Although not shown in the Figures, the press platen 64 may include longitudinal recesses into which the pinch bladders 68*a*, 68*b* may retract, similar to the recesses 90 in an alternate embodiment discussed below in connection with FIGS. 8-10. Retraction of the pinch bladders 68*a*, 68*b* into these recesses allows the press platen 64 to engage the opposite sides of 70, 74 of the stringer charge 30 face-to-face.

As the male die 62 begins forming the stringer charge 30 into the mold cavity 54 (FIG. 5), the downward pressure exerted by the pinch bladder 68*a* against one side 70 of the charge 30 is sufficient to prevent lateral movement or slippage of the stringer charge 30 between the pinch bladder 68*a*, and tool surface 56. In contrast, however, while the downward pressure exerted by pinch bladder 68*b* against the other side 74 of the stringer charge 30 is sufficient to maintain the stringer charge 30 in tension, it is insufficient to prevent slippage of the stringer charge 30 over the tool surface 58. Consequently, the other side 74 of the stringer charge 30 slips 72 between the pinch bladder 68*b* and the tool surface 58, toward the mold cavity 54, as the male die 62 continues downwardly into the mold cavity 54.

At the stage of downward progression of the male die 62 shown in FIG. 5, it can be seen that the centerline 32 of the stringer charge 30 has moved laterally toward the centerline 28 of the mold cavity 54. The other side 74 of the charge 30 continues to slip beneath pinch bladder 68*b* until the hat portion 34 (FIG. 2) of the charge 30 has been fully formed into the mold cavity 54, as shown in FIG. 6. When the charge 30 has been fully formed (FIG. 6), the centerline 32 of the charge 30 is substantially aligned with the centerline 28 of the mold cavity 54.

Figure 7:
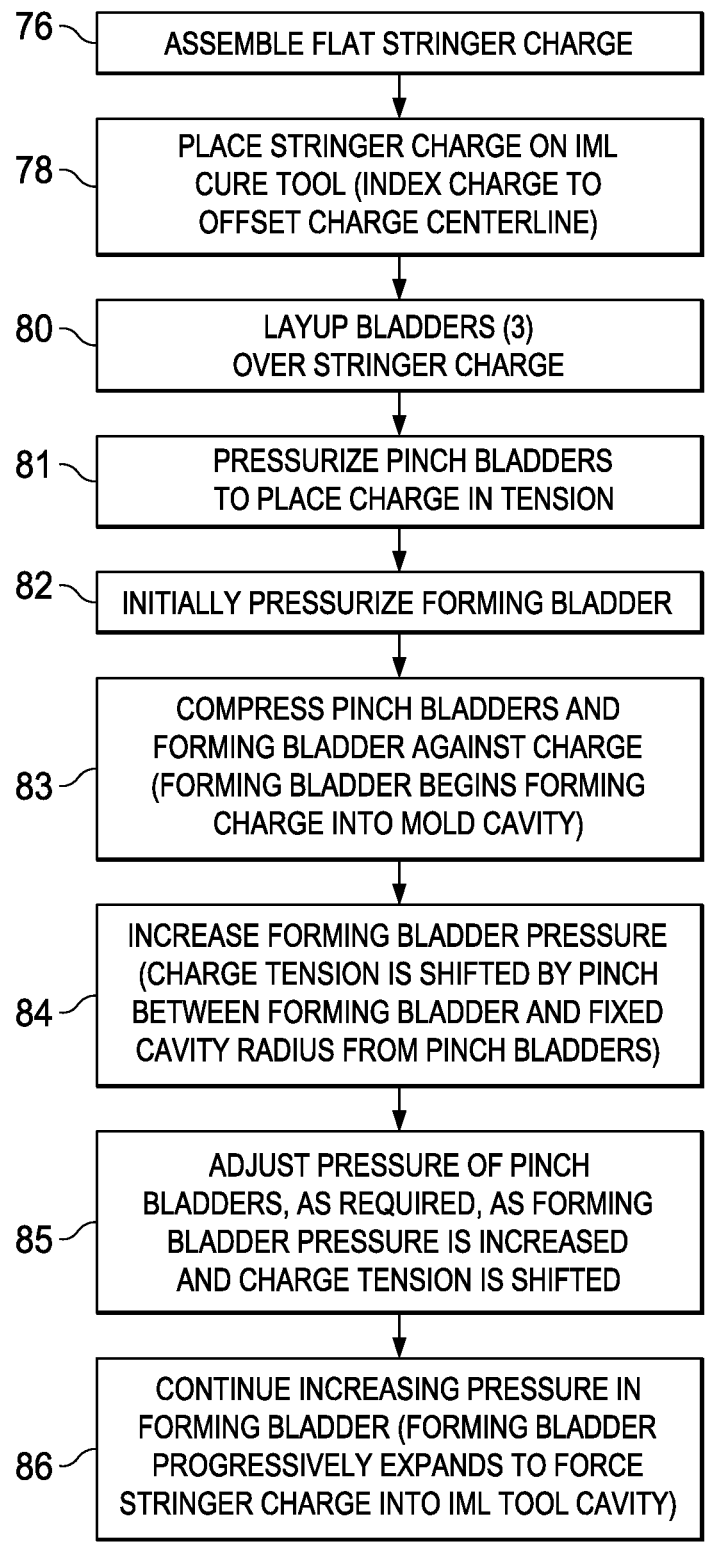
FIG. 7 is an illustration of a flow diagram of another embodiment of a method of forming a composite stringer charge.

Attention is now directed to FIG. 7 which illustrates the overall steps of an alternate method of forming a stringer charge 30 in place, along with FIGS. 8-11 which show an alternate form of the apparatus 92. Referring particularly to FIG. 8, the apparatus 92 is generally similar to the apparatus 50 previously described with several exceptions. In this example, the IML tool 52 is a three-piece tool assembly comprising a pair of spaced-apart side tools 53 mounted on a tool base 88. The press platen 64 is provided with longitudinally extending recesses 90 into which the pinch bladders 68*a*, 68*b* may retract in a late stage of processing cycle described below. Also, in this embodiment, the composite charge 30 is forced into the mold cavity 54 by a forming bladder 94 which is positioned above the charge 30, along the centerline 28 of the molding cavity 54. The forming bladder 94 may comprise any suitable, flexible material, such as an elastomer, that may be inflated by internal pressurization. In some embodiments, it may be necessary or desirable to reinforce the walls of the forming bladder 94 so that they possess sufficient rigidity and strength to force the charge 30 against the surfaces of the IML tool 52. The walls of the forming bladder 94 may be reinforced using a suitable liner, or by increasing the thickness of the walls in preselected areas, or by other techniques known in the art.

The forming method shown in FIG. 7 begins at step 76 in which a flat stringer charge 30 is assembled, as previously described. At step 78, the stringer charge 30 is placed on the IML cure tool 52, and supported on the upper surfaces of the two side tools 53. Although not shown in FIG. 8, the charge 30 is indexed during placement on the IML cure tool 52 such that its centerline 32 is offset from the centerline 28 of the IML cure tool 52, similar to the procedure previously described in connection with FIGS. 4-6, thereby providing control over the final location of the centerline 32 of the charge 30. Next, at step 80, the pinch bladders 68*a*, 68*b* along with the forming bladder 94 are laid up on top of the stringer charge 30. At step 81, the pinch bladders 68*a*, 68*b* are pressurized in order to place the charge 30 in tension while holding them against the side tools 53. Similar to the method previously described, pinch bladder 68*a* is pressurized to a level that is greater than the pressure of pinch bladder 68*b* to allow the charge 30 slip beneath pinch bladder 68*b* as the charge 30 is being formed into the mold cavity 54. At step 82, the forming bladder 94 is initially pressurized to a preselected pressure, thereby partially inflating the forming bladder 94.

Next, at step 83, the press platen 64 moves downwardly, compressing the pinch bladders 68*a*, 68*b*, while also compressing the forming bladder 94 against the charge 30. At this point, the forming bladder 94 begins forming the charge 30 into the mold cavity 54 while the pinch bladders 68*a*, 68*b* function to hold the charge 30 in tension. The pressure of the forming a bladder 94 is then further increased at step 84, causing the forming bladder 94 to further inflate, expand and force the charge 30 into the mold cavity 54, as shown in FIG. 10. As the forming bladder 94 inflates and expands further, the tension on the charge 30 is shifted by a "radius pinch" on the charge produced by the forming bladder 94.

As shown at step 85, as the pressure in the forming bladder 94 is increased, the pressure in the pinch bladders and 68*a*, 68*b* is adjusted, as required, as the tension on the charge 30 is shifted from the pinch bladders 68*a*, 68*b* to the forming bladder 94. As shown at 86, the pressure in the forming bladder 94 continues to be increased, causing the forming bladder 94 to progressively expand, until the forming bladder 94 fills the entire mold cavity 54 and fully forms the hat 22 (FIG. 1). FIG. 11 illustrates the forming bladder 94 having been fully inflated and taking the shape of the mold cavity 54, forcing the stringer charge 30 against the IML tool 52. As the forming bladder 94 expands from its size and shape shown in FIG. 10, to the size and shape shown in FIG. 11, the press platen 64 moves down against the side tools and the pressure in the pinch bladders 68*a*, 68*b* is reduced, allowing the pinch bladders 68*a*, 68*b* to deflate and retract into the recesses 90 in the press platen 64.

Figure 12:
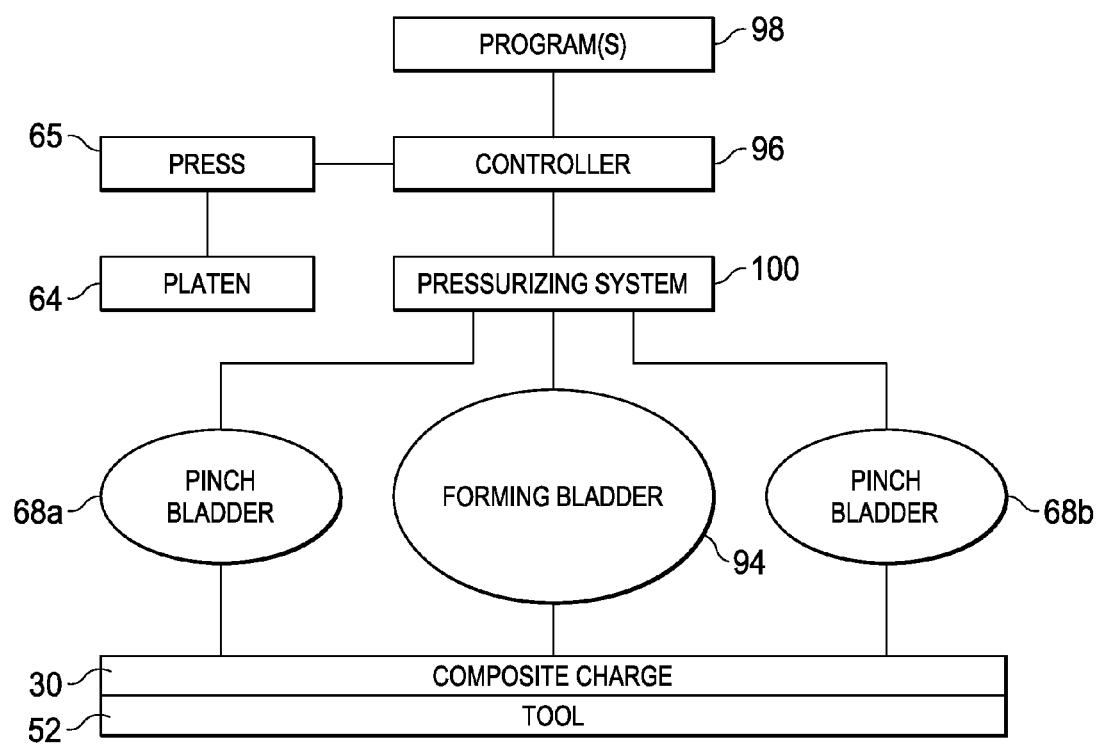
FIG. 12 is an illustration of an overall block diagram of the apparatus.

Attention is now directed to FIG. 12 which illustrates system components for pressurizing and controlling the apparatus 92 shown in FIGS. 8-11. The pinch bladders 68a, 68b and the forming bladder 94 are coupled with a suitable pressurizing system 100 which may comprise an electronically controlled pneumatic system which independently controls pressurization of each of the pinch bladders 68a, 68b and the forming bladder 94. The pressurizing system 100 may be coupled with a controller 96 which may comprise a PLC (programmable logic controller) or a general-purpose computer having suitable software control programs 98. The controller 96 may also control the operation of a machine such as a press 65 to control the movement and pressure applied by the platen 64. Thus, inflation and pressurization of the pinch bladders 68a, 68b and the forming bladder 94 are automatically controlled and coordinated with the movement and pressure applied by the platen 64.

Figure 13:
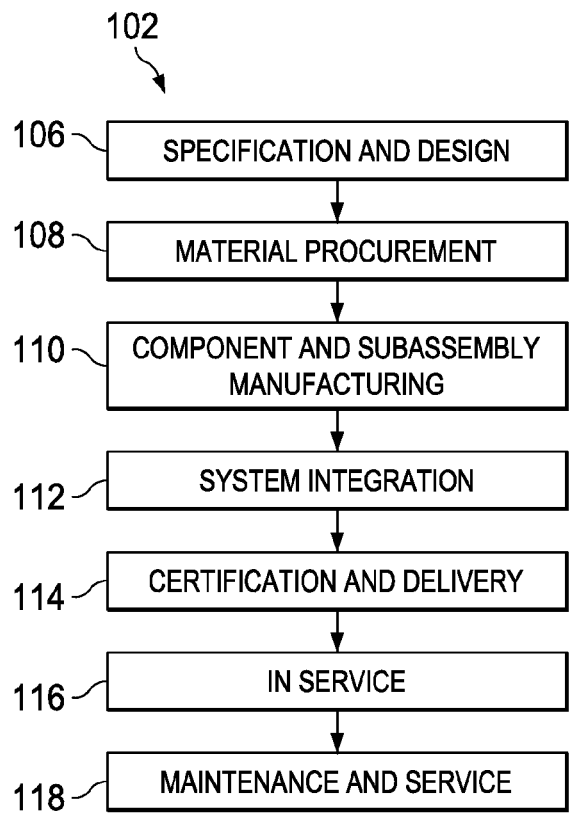
FIG. 13 is an illustration of a flow diagram of aircraft production and service methodology.
Figure 14:
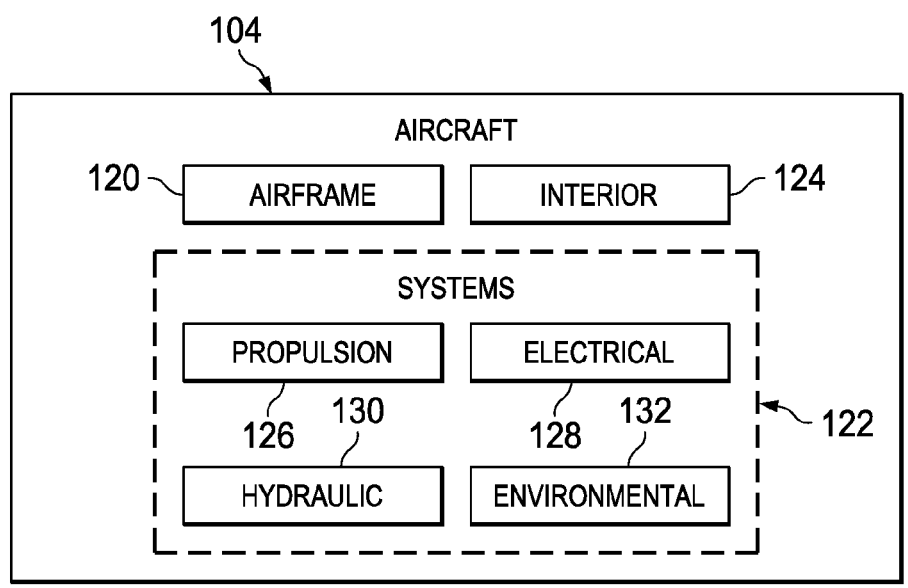
FIG. 14 is an illustration of a block diagram of an aircraft.

Embodiments of the disclosure may find use in a variety of potential applications, particularly in the transportation industry, including for example, aerospace, marine, automotive applications and other applications where composite parts must be formed and cured. Thus, referring now to FIGS. 13 and 14, embodiments of the disclosure may be used in the context of an aircraft manufacturing and service method 102 as shown in FIG. 13 and an aircraft 104 as shown in FIG. 14. Aircraft applications of the disclosed embodiments may include, for example, without limitation, fabrication of stiffener members such as, without limitation beams, spars and stringers, to name only a few. During pre-production, exemplary method 102 may include specification and design 106 of the aircraft of 104 and material procurement 108. During production, component and subassembly manufacturing 110 and system integration 112 of the aircraft 104 takes place. Thereafter, the aircraft 104 may go through certification and delivery 114 in order to be placed in service 116. While in service by a customer, the aircraft 104 is scheduled for routine maintenance and service 116, which may also include modification, reconfiguration, refurbishment, and so on.

Each of the processes of method 102 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 104 produced by exemplary method 102 may include an airframe 120 with a plurality of systems 122 and an interior 124. Examples of high-level systems 122 include one or more of a propulsion system 126, an electrical system 128, a hydraulic system 130, and an environmental system 132. Any number of other systems may be included. Although an aerospace example is shown, the principles of the disclosure may be applied to other industries, such as the marine and automotive industries.

Systems and methods embodied herein may be employed during any one or more of the stages of the production and service method 102. For example, components or subassemblies corresponding to production process 110 may be fabricated or manufactured in a manner similar to components or subassemblies produced while the aircraft 104 is in service. Also, one or more apparatus embodiments, method embodiments, or a combination thereof may be utilized during the production stages 110 and 112, for example, by substantially expediting assembly of or reducing the cost of an aircraft 104. Similarly, one or more of apparatus embodiments, method embodiments, or a combination thereof may be utilized while the aircraft 24 is in service, for example and without limitation, to maintenance and service 118.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a composite part, comprising:
   placing a composite charge on a tool spanning a mold cavity in the tool;
   forming the composite charge into the mold cavity; and
   holding opposite sides of the composite charge against the tool as the composite charge is being formed into the mold cavity, including holding one of the opposite sides of the composite charge against movement on the tool during forming of the composite charge into the mold cavity while allowing the other of the opposite side of the composite charge to slip over the tool.

2. The method of claim 1, wherein placing the composite charge on the tool includes offsetting a centerline of the composite charge from a centerline of the mold cavity.

3. The method of claim 2, wherein the centerline of the composite charge is offset from the centerline of the mold cavity by a distance.

4. The method of claim 1, wherein forming the composite charge into the mold cavity is performed by:
   forcing a forming bladder into the mold cavity, and
   expanding the forming bladder as the forming bladder is being forced into the mold cavity.

5. The method of claim 1, wherein holding opposite sides of the composite charge against the tool is performed by:
   bringing first and second bladders into contact with the opposite sides of the composite charge, and
   pressurizing each of the first and second bladders.

6. The method of claim 5, wherein holding one of the opposite sides of the composite charge against movement while allowing the other of the opposite side of the composite charge to slip over the tool is performed by pressurizing the first bladder to a pressure higher than the pressure of the second bladder.

7. The method of claim 1, wherein:
   forming the composite charge into the mold cavity is performed by bringing a forming bladder into contact with the charge, forcing the forming bladder into the mold cavity, and inflating the forming bladder as the forming bladder is forced into the mold cavity, and
   holding opposite sides of the composite charge against the tool using first and second pinch bladders, and adjusting a pressurization of at least one of the first and second pinch bladders as the forming bladder moves into the mold cavity.

8. A method of fabricating a composite stiffener, comprising:
   laying up a generally flat composite charge having first and second opposite sides, and having a centerline;
   placing the composite charge on an inner mold line cure tool having a mold cavity with a centerline, including indexing the composite charge on the cure tool such that the centerline of the composite charge is offset from the centerline of the mold cavity;

forming the composite charge into the mold cavity;

holding the first side of the composite charge against the cure tool with a force sufficient to prevent movement of the first side as the composite charge is being formed into the mold cavity, and holding the second side against the tool with a force that allows the second side to slip toward the mold cavity as the composite charge is being formed into the mold cavity.

9. The method of claim 8, wherein indexing the composite charge on the cure tool includes offsetting the centerline of the composite charge from the centerline of the mold cavity a distance.

10. The method of claim 8, wherein:

holding the first and second sides of the composite charge against the tool is respectively performed using first and second pinch bladders, and inflating the first and second pinch bladders to differing levels of pressurization.

11. The method of claim 10, wherein:

forming the composite charge into the mold cavity is performed by bringing a forming bladder into contact with the composite charge and progressively inflating the forming bladder.

12. The method of claim 11, further comprising:

adjusting the level of pressurization of the second pinch bladder as the forming bladder is being progressively inflated.

13. A method of fabricating a composite stiffener having a hat and a pair of opposite flanges, comprising:

laying up a composite charge;

placing the composite charge on a tool spanning a mold cavity in the tool;

applying a first pressure to a first portion of the composite charge, the first pressure being sufficient to hold the first portion against movement on the tool while the hat of the composite stiffener is being formed; and applying a second pressure to a second portion of the composite charge to hold the second portion in tension against the tool while the hat of the composite stiffener is being formed; and forming the hat of the composite stiffener into the cavity by allowing the second portion to slip over the tool toward the cavity.

14. The method of claim 13, wherein:

placing the composite charge on the tool includes indexing the composite charge on the tool such that a centerline of the composite charge is offset a preselected distance from a centerline of the mold cavity.

15. The method of claim 13, wherein applying the first pressure further comprises:

placing a first bladder against the first portion, and using the first bladder to apply a first compressive force against the first portion sufficient to prevent slippage of the first portion relative to the tool.

16. The method of claim 15, wherein applying the second pressure further comprises:

placing a second bladder against the second portion, and using the second bladder to apply a second compressive force against the second portion that is less than the first compressive force applied to the first portion by the first bladder.

\* \* \* \* \*